United States Patent
Kato et al.

[11] Patent Number: 5,701,157
[45] Date of Patent: Dec. 23, 1997

[54] APPARATUS INCLUDING ELECTRONIC AND OPTICAL ZOOMING

[75] Inventors: Takashi Kato, Kawasaki; Jun Tokumitsu, Sagamihara; Shigeyuki Suda, Yokohama, all of Japan

[73] Assignee: Canon Kabushiki Kaisha, Tokyo, Japan

[21] Appl. No.: 87,856

[22] Filed: Jul. 9, 1993

[30] Foreign Application Priority Data

Jul. 14, 1992 [JP] Japan .................................. 4-209727

[51] Int. Cl.$^6$ ...................... H04N 5/262; H04N 5/225
[52] U.S. Cl. ............................................ 348/240; 348/358
[58] Field of Search .................................. 348/207, 240, 348/335, 340, 358, 208; H04N 5/262

[56] References Cited

U.S. PATENT DOCUMENTS

| | | | |
|---|---|---|---|
| 4,843,475 | 6/1989 | Imai | 358/225 |
| 4,862,285 | 8/1989 | Miyakawa | 358/451 |
| 4,905,096 | 2/1990 | Moriya | 358/451 |
| 5,420,632 | 5/1995 | Yamagiwa | 348/240 |
| 5,565,919 | 10/1996 | Wakabayashi et al. | 348/373 |

FOREIGN PATENT DOCUMENTS

| | | | |
|---|---|---|---|
| 0541092 | 5/1993 | European Pat. Off. | H04N 5/232 |
| 4-316286 | 11/1992 | Japan | H04N 5/232 |
| 4-373368 | 12/1992 | Japan | H04N 5/228 |
| 4373368 | 12/1992 | Japan | H04N 5/228 |

*Primary Examiner*—Andrew Faile
*Assistant Examiner*—Ngoc-Yen Vu
*Attorney, Agent, or Firm*—Fitzpatrick, Cella, Harper & Scinto

[57] ABSTRACT

The invention relates to an image pickup apparatus provided with a zoom lens, a converter for converting an optical image, formed by the zoom lens, into an electrical signal, a processor for processing the electrical signal for executing electronic zooming and a controller for controlling simultaneous execution of the optical zooming by the zoom lens and the electronic zooming.

7 Claims, 6 Drawing Sheets

APPARATUS INCLUDING ELECTRONIC AND OPTICAL ZOOMING

BACKGROUND OF THE INVENTION

1. Field of the Invention

The present invention relates to an image pickup apparatus, and more particularly to an image pickup apparatus adapted for use in a television camera or a video camera, capable of combining optical changing magnification (zooming) achieved by movement on an optical axis of a part of the lenses constituting an optical system and an electronic zooming achieved by the control of an image signal obtained from an image element on which the image of an object is formed by said optical system, or activating both of the zooming functions at the same time, thereby arbitrarily controlling the speed for changing the magnification (the zooming speed).

2. Related Background Art

In the phototaking systems of the image taking apparatus such as video camera or still cameras, zoom lenses are often employed for obtaining the images of desired magnifications.

The zoom lens generally becomes larger and heavier according to the increase in the zooming ratio. For this reason, it is an important target, in the image taking apparatus such as video camera, to reduce the dimension and the weight of the entire apparatus while attaining a high ratio of changing the magnification.

In the conventional image taking apparatus such as a video camera, for overcoming the above-mentioned problem, there has been proposed an electronic method (an electronic zooming) which can employ a display for expanding or contracting the image by electronic control on the image signal from the image pickup means (image pickup element) without depending on an optical method (an optical zooming), as disclosed in the Journal of Television Association (1989 Convention of the Television Association; 8-1 etc.).

Such electronic method enables a portion of the image to be enlarged reduced with an arbitrary magnification.

The image taking apparatus using the changing magnification by such electronic method can attain a high zooming ratio, by initially employing the changing magnification by the optical zooming and then further changing magnification by utilizing the electronic zooming.

Also in the field of optical zooming, there has been proposed an image pickup device in which the changing of the taken image is made to be uniform, by the control of the changing magnification (zooming) speed, or the speed of variation of the image magnification.

Such zooming speed control has been achieved by the control of the speed of a variator constituting a part of the zoom lens. More specifically, the changing in the image angle within the optical changing magnification range is made as uniform as possible, in a zoom lens employing a larger image angle changing at the optical shorter focal length side, by increasing the zooming speed of the variator at the longer focal length side or decreasing said zooming speed of the variator at the optical shorter focal length side, and, in a zoom lens showing a larger image angle variation at the longer focal length side, by decreasing the zooming speed of the variator at the longer focal length side.

In the above-mentioned image taking apparatus employing a zooming by the first optical method with a zoom lens and by then electronic zooming for further changing of the image magnification, the optical zooming speed is limited by a mechanical limitation. For this reason it is difficult to arbitrarily adjust the zooming speed at the zooming operation, and the zooming time is given by the sum of the optical zooming time and the electronic zooming time and cannot be arbitrarily selected.

Also in a zoom lens showing a larger image angle variation at the shorter focal length side when the variator lens is moved at a constant speed, the speed for changing the magnification said variator lens has to be moved slower than the ordinary speed in order to facilitate the tracking of the compensator lens on the cam locus in the longer focal length side.

However, if the changing magnification speed of said variator is made slower, the image angle variation becomes smaller as the focal length becomes longer, whereby the image angle variation in the zooming operation from the shorter focal length side to the longer focal length side appears in an unnatural manner.

Also if the image angle variation by the zooming operation is made uniform by reducing the changing magnification speed of the variator lens from the ordinary speed at the shorter focal length side while optically zooming, there is required a longer zooming time so that a rapid zooming operation cannot be realized.

Also in a zoom lens type showing a larger image angle variation at the optical longer focal length side when the variator lens is moved at a constant speed, if the image angle variation is made uniform by reducing the zooming speed of the variator lens at the longer focal length side, a rapid zooming operation cannot be realized.

SUMMARY OF THE INVENTION

The object of the present invention is to provide an image pickup device adapted for use in a television camera, a video camera or the like arbitrarily adjusting the image angle variation and the zooming speed in the zooming operation by combining optical zooming and electronic zooming, and also achieving the zooming operation with any arbitrary speed, without various optical limitations in the changing magnification speed of the optical zooming.

According to a preferred embodiment of the present invention, there is provided an image pickup device provided with an optical zooming function by optical-axially moving at least a series of the zoom lenses constituting a zoom lens and an electronic zooming function by focusing the image of an object on a surface of image pickup means by said zoom lens and controlling the image signal obtained from said image pickup means, for displaying the image with a desired image magnification, wherein, at the changing magnification operation, the zooming speed is controlled by zooming control means through a combination of said optical zooming and said electronic zooming or through simultaneous functions thereof.

Particularly in a zoom lens showing a larger image angle variation at the optical shorter focal length side, at the optical zooming operation from the optical shorter focal length side to the longer focal length side, the present invention is featured by increasing the speed of magnification increase of said electronic zooming as the optical focal length increases, or increasing the speed of magnification decrease of said electronic zooming as the optical focal length decreases.

Also for a zoom lens showing a larger image angle variation at the longer focal length side, at the zooming operation from the shorter focal length side to the longer focal length side, the present invention is characterized by increasing the speed of magnification increase of said electronic zooming as the optical focal length decreases, or increasing the speed of magnification decrease of said electronic zooming as the optical focal length increases.

DETAILED DESCRIPTION OF THE PREFERRED EMBODIMENTS

Figure 1:
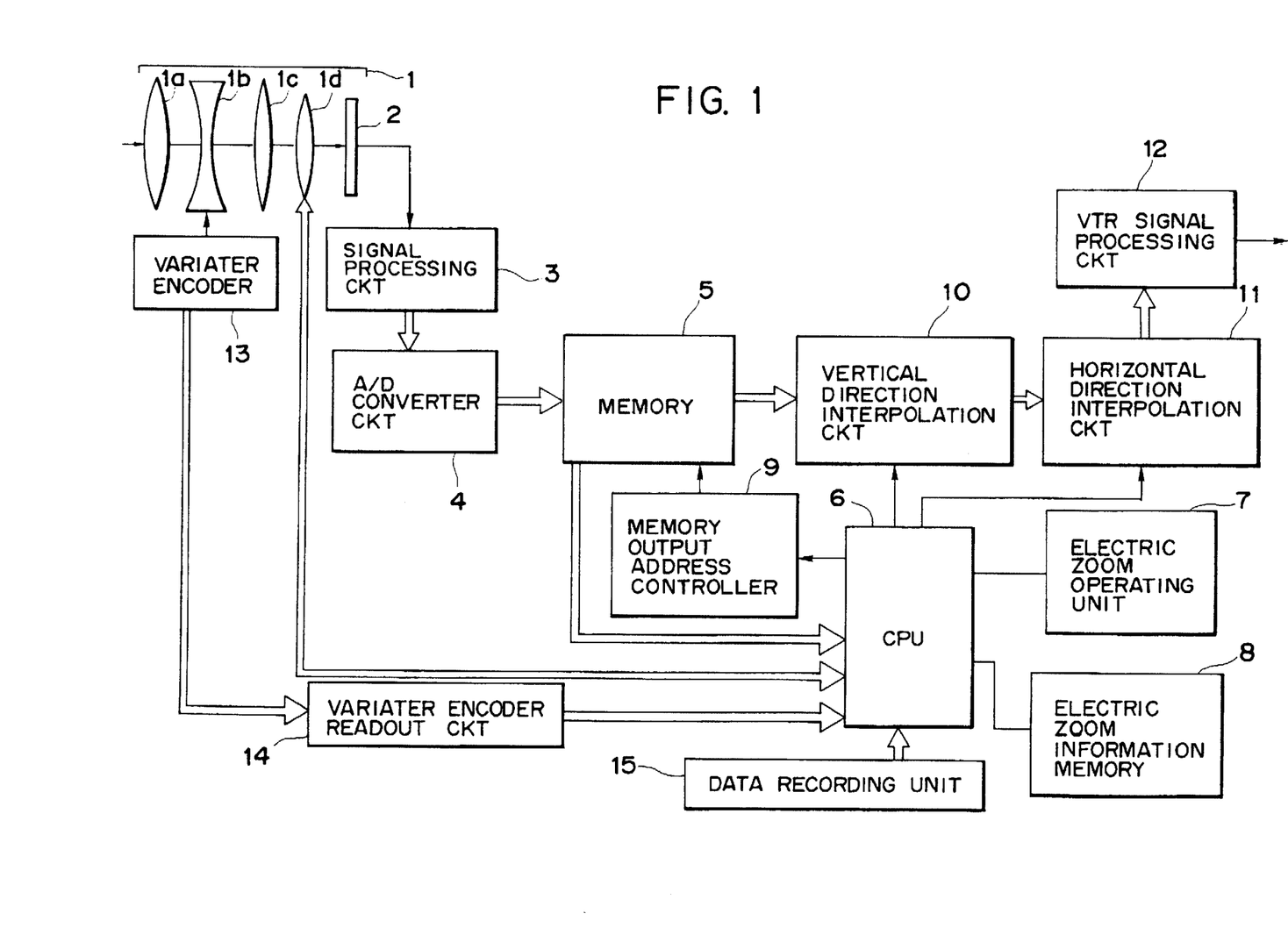
FIG. 1 is a schematic block diagram of an embodiment 1 of the image pickup device of the present invention.

FIG. 1 is a main block diagram of an embodiment 1 of the image pickup device of the present invention, wherein a phototaking system 1 is composed of a known zoom lens of rear focusing type.

There are provided a fixed first lens group 1a; a second lens group (variator lens) 1b for changing magnification; a fixed third lens group 1c; a fourth lens group 1d for correcting the changing in the image plane caused by changing magnification and also effecting the focusing function; and an image pickup element 2 as image pickup means.

In the rear focusing zoom lens employed in the present embodiment, the fourth lens group 1d is moved optical-axially in response to a change of the object distance (for focusing) and to a change of the focal length (for zooming), thereby placing the focal plane on the image pickup element 2 in such zooming and focusing operations.

In the present embodiment, the image of the object is focused by the phototaking system 1 onto the image pickup means (image pickup element) 2, which effects photoelectric conversion and supplies a signal processing circuit 3 with an image signal corresponding to said object image.

Said image processing circuit 3 is composed of unshown components such as an amplifying circuit, a matrix circuit, a gamma-correction circuit, an encoder etc. and converts said image signal which is output by the image pickup element 2 into a luminance signal and color signals.

The signals output from said signal processing circuit 3 are converted by an A/D converter 4 into digital signals, which are stored in a memory 5. A microcomputer (CPU) 6 as control means reads the image signal information in the taken image area from the memory 5, and also reads the information on the image area from the memory 5, based on the electronic zooming information from an electronic zooming unit 7 and an electronic zoom information memory 8, for supply to a memory output address controller 9.

The image signal read by said controller 9 from the memory 5 is expanded and interpolated in a vertical direction or in a horizontal direction, or contracted by a vertical interpolation circuit 10 and a horizontal interpolation circuit 11, then converted into a standard television signal of a predetermined format and is input to a VTR signal processing circuit 12.

In said processing circuit 12, the luminance signal is changed to frequency modulation while the color signals with carriers are converted into a low frequency region, and these signals are multiplexed to output an image signal.

In the present embodiment, when the variator lens 1b is optical-axially moved by the driving means (not shown), the position of said lens is detected by a variator encoder 13. The output signal from the variator encoder 13 changes corresponding to the changing magnification position of said variator lens 1b. Said output signal is supplied, through a variator encoder reading circuit 14, to the CPU 6, which detects the focal position and the image angle of the phototaking system 1, by referring to said signal and data from a data memory 15.

Corresponding to the thus detected focal position and image angle of the phototaking system 1, the CPU 6 reads out the image information in the taken image area stored in the memory 5, and also read out the information of the image signal area from the memory 5, based on the electronic zooming information from the electronic zooming unit 7 and the electronic zoom information memory 8, for output into the memory output address controller 9.

The image signal read out by the controller 9 from the memory 5 is subjected, as explained above, to the enlargement or contraction in the vertical and horizontal directions by the vertical and horizontal interpolation circuits 10, 11, respectively, then converted into a standard television signal or a predetermined format, and is output from the VTR signal processing circuit 12 in the form of a desired image signal.

In the following there will be explained the function of the present embodiment, with reference to a flow chart shown in FIG. 2, wherein the image information makes one cycle per about 1/60 seconds.

At first a step 21 turns on the power supply in an equipment including the electronic zooming means, and effects initial install of various measured values. Then a step 22 fetches the information on the changing magnification position of the variator lens 1b by utilizing the output signal of the variator encoder 13. Then based on said information of the changing magnification position, the contents of the data memory unit 15 and the electronic zoom information memory 8 are read out, and a step 23 discriminates whether an electronic zooming switch is turned ON or OFF.

If said switch is identified as OFF (N), the sequence proceeds to a step 24 for maintaining the area of the original image area read out from the memory 5 thereby setting the output image area the same as in the preceding cycle or in the initial setting.

On the other hand, if the step 23 identifies said electronic zooming switch as ON (Y), the sequence proceeds to a step 25 for discriminating whether the original image area is to be magnified or reduced, based on the electronic zoom information from said information memory 8 and the data from the data memory 15.

In case the original image area is to be magnified, namely in case a direction of the electronic zooming lies in an end from the shorter focal length to the longer focal length, the sequence proceeds to a step 26 for reducing the original output image area, thereby increasing the magnification of the image.

On the other hand, in case the electronic zooming is conducted from the longer focal length to the shorter focal length, the sequence proceeds to a step 27 to increase the original output image area, thereby reducing the magnification of the image.

After the above-explained process, a step 28 calculates the correlation of the signal in the vertical direction in the original output image area, and a step 29 effects the interpolation in the vertical direction. Then a step 30 as well calculates the correlation of the signal in the horizontal direction in the original output image area, and a step 31 effects the interpolation calculation in the horizontal direction. After the completion of a cycle, the sequence returns to the step 22 for repeating the above-explained process.

Figure 3:
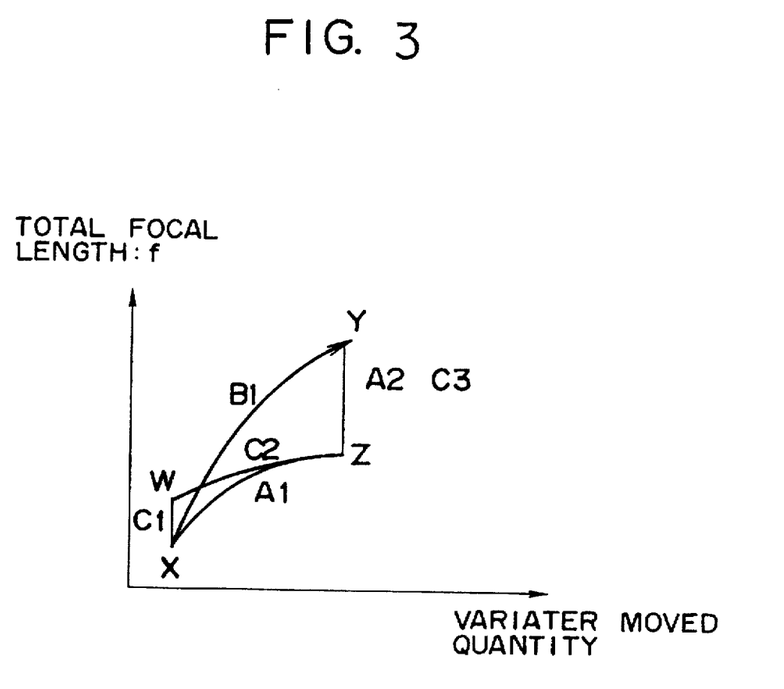
FIG. 3 is a chart showing the relationship between the focal lengths of the optical and electronic zoomings and the amount of movement of the variator in the embodiment 1 of the present invention.

FIG. 3 is a chart showing the relationship between the focal lengths of the optical and electronic zoomings and the amount of movement of the variator lens, in the embodiment 1 of the present invention.

In the zooming operation in the conventional image pickup device, at first the optical zooming is conducted, and, after the completion thereof, the electronic zooming is conducted in succession. In such case the zooming operation starts from a shortest focal length X in the optical and electronic senses (hereinafter called the total shortest focal length), and moves along a zooming path A1 (zooming time Ta1) by the optical zooming, to reach an optically longest focal length Z.

Then, from said optically longest focal length Z, the zooming operation moves along a zooming path A2 (zooming time Ta2) by the electronic zooming, to reach a longest focal length Y in the optical and electronic senses (hereinafter called total longest focal length), whereby the zooming operation is completed. The zooming time in this case is determined by the sum of the optical zooming time Ta1 and the electronic zooming time Ta2.

In contrast, in the present embodiment, the changing magnification speed from the total shortest focal length X to the total longest focal length Y can be arbitrarily selected by combining, or simultaneously effecting, the optical zooming and the electronic zooming.

For example, the shortest zooming time TS and the longest zooming time TL are given as follows.

The zooming operation providing the shortest zooming time TS moves along a path B1, in which the optical zooming and the electronic zooming are simultaneously activated from the total shortest focal length X to the total longest focal length Y. The principle of this zooming operation will be explained with reference to FIGS. 1 and 3.

With the optical-axial movement of the variator lens 1b from the total shortest focal length X, the output signal of the variator encoder 13, indicating the changing magnification position of said variator lens 1b, varies. Said output signal is input, through the variator encoder reading-out circuit 14, into the CPU 6, which detects the focal position and the image angle of the phototaking system 1, by referring to said signal and the data from the data memory 15.

Simultaneously with the optical axial movement of the variator lens 1b toward a longer focal length and a smaller image angle, the CPU 6 sends the electronic zooming information from the electronic zooming operation unit 7 and the electronic zoom information memory 8 to the memory output address controller 9, in order to reduce the original output image area taken out from the memory 5, based on said electronic zooming information.

The image signal read out by said controller 9 from the memory 5 is subjected to a magnification interpolation in the vertical and horizontal directions by the vertical and horizontal interpolation circuits 10, 11, and is converted into a standard television signal of a predetermined format, whereby a desired image signal is obtained from the VTR signal processing circuit 12.

The shortest zooming time TS is determined by the optical zooming time TP1; namely TS and TP1 satisfies following equations;

$$TS = TP1 \qquad (1)$$

because the optical zooming time TP1 is longer than the electronic zooming time Td1.

Within such shortest zooming time TS, the image magnification by the electronic zooming in a path (B1) between the total shortest focal length X and the total longest focal length Y can be conducted in arbitrary manner. For example, the electronic zooming time Td1 can be made the same as the optical zooming time TP1 (as long as TP1=Td1, the changing magnification speed in the electronic zooming can be selected arbitrarily), or the image magnification by the electronic zooming may be conducted in a part within the optical zooming range.

In the following there will be explained the changing magnification path relating to the longest zooming time TL. From the total shortest focal length X, the electronic zooming alone is driven, without the optical zooming. In this state the CPU 6 sends the electronic zooming information from the electronic zooming unit 7 and the electronic zoom information memory 8 to the memory output address controller 9, in order to reduce the original output image area take in from the memory 5, based on said information.

A desired image signal is obtained from the VTR signal processing circuit 12, through some circuits in the same manner as in the case of the shortest zooming time TS. The changing magnification operation way in this electronic zooming assumes a path C1, shown in FIG. 3, from the total shortest focal length X to an electronic longest focal length W. The optical zooming starts when said focal length W is reached by the electronic zooming.

When the variator lens 1b starts to move along the optical axis, the output signal of the variator encoder 13 varies on a basis of the changing magnification position of said variator lens 1b. Said output signal is input through the variator reading circuit 14 to the CPU 6.

The CPU 6 detects the focal position and the image angle of the phototaking system 1, based on said signal and the data from the data memory 15, and outputs the electronic zooming information from the electronic zooming control unit 7 and the electronic zoom information memory 8 to the memory output address controller 9, in order to increase the original output image area read out from the memory 5, based on said information.

Thus, in the present embodiment, as explained in the foregoing, along the changing magnification path C2, the image magnification of the optical zooming is increased while that of the electronic zooming is decreased, thereby attaining a smooth variation for the image angle.

In this operation, the changing magnification speed of the electronic zooming can be arbitrarily selected within said path C2. For example the image magnification may be decreased at a constant speed, or at a suitably adjusted variable speed.

Furthermore, the electronic zooming may be activated over the entire range of the zooming path C2 or in a part thereof.

When the focal length reaches the optically longest focal length Z, the electronic zooming lies in a state without variation in the magnification. The CPU 6 outputs the electronic zoom information from the electronic zooming unit 7 and the electronic zoom information memory 8 to the memory output address controller 9, in order to reduce the original output image area obtained from the memory 5 (namely increasing magnification), based on said information.

Thereafter a desired image signal is obtained from the VTR signal processing circuit 12, according to the procedure explained before.

This zooming operation corresponds to a path C3 in FIG. 3. In said path C3, the electronic zooming alone is activated to increase the image magnification, and the zooming operation is completed upon reaching the total longest focal length Y through said path C3.

The longest zooming time TL in the present embodiment (corresponding to the paths C1+C2+C3) can be represented by:

$$TL = Td1 + TP1 + Td1 \quad (2)$$

wherein TP1 and Td1 are respectively the longest optical zooming time and the longest electronic zooming time within a range in which the variation of the image angle appears natural.

However this is merely an example, and the zooming speeds of the optical and electronic zoomings may be both made variable or the zooming speed of the electronic zooming may be made variable in the paths C1 and C3, within a range of the total focal length, in which the variation of the image angle appears natural. For example, in a magnification increasing operation from a shorter focal length to a longer focal length in the total focal length, the variation of the image angle appears unnatural if the focal length decreases in a portion.

As explained above, the present embodiment can arbitrarily control the changing magnification speed from the shortest focal length X of the optical zooming to the total longest focal length Y including the optical and electronic zoomings, by changing magnification control means such as a CPU, by combining the optical and electronic zooming operations as explained before or simultaneously activating both zoomings, and also can effect the zooming operation without various limitations in changing magnification speed of the optical zooming.

Figure 4:
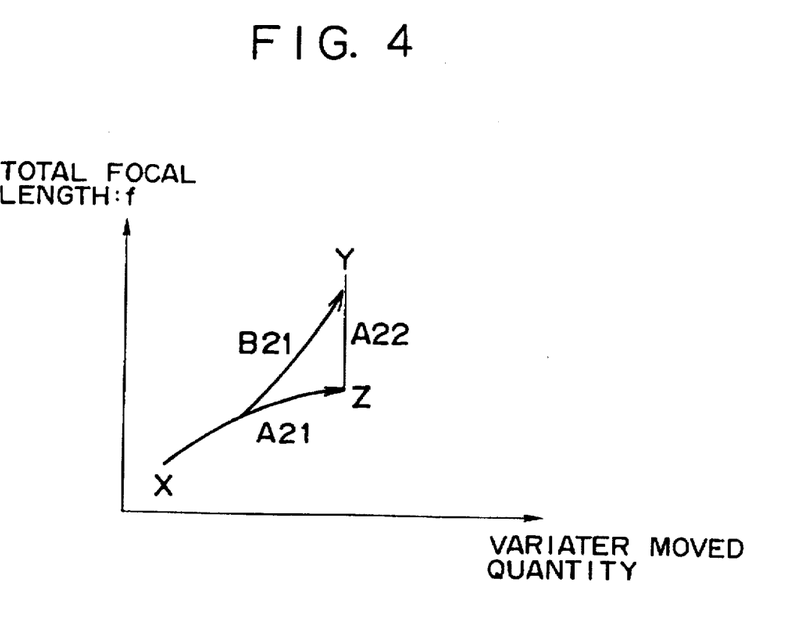
FIG. 4 is a chart showing the relationship between the focal lengths of the optical and electronic zoomings and the amount of movement of the variator lens in the embodiment 2 of the present invention.

FIG. 4 is a chart showing the relationship between the focal lengths of the optical and electronic zoomings and the amount of movement of the variator lens, in a second embodiment of the present invention.

The conventional zooming is achieved by effecting the optical zooming from the total shortest focal length X to the optical longest focal length Z along a zooming path A21, and then effecting the electronic zooming from said optical longest focal length Z to the total longest focal length Y through a path A22 to complete the zooming. The zooming time in this case is given by the sum of the optical zooming time (corresponding to the path A21) and the electronic zooming time (corresponding to the path A22).

In contrast, in the present embodiment, the zooming operation is achieved by starting the optical zooming from the total shortest focal length X, and then starting the electronic zooming also from an optical intermediate focal length region until the total longest focal length Y to complete the zooming. The zooming operation way in this case proceeds along a path B21.

In a zoom lens showing a larger image angle variation in the shorter focal length side in the optical zooming from the shorter focal length side to the longer focal length side, a smooth zooming operation cannot be attained with a constant moving speed of the variator lens, because the image angle variation is small at the longer focal length side. This drawback is resolved in the present embodiment, by activating the electronic zooming in the longer focal length region, thereby enhancing the increase in the magnification and increasing the image angle variation.

Also if the image magnification is increased by the electronic zooming in the optical longer focal length side, the image angle variation is not detrimentally affected even when the moving speed of the variator lens is made slower than the ordinary speed, so that the tracking of the cam locus by the compensator lens can be facilitated.

In this zooming operation, the zooming speeds of the optical and electronic zoomings may be constant or made variable.

Figure 5:
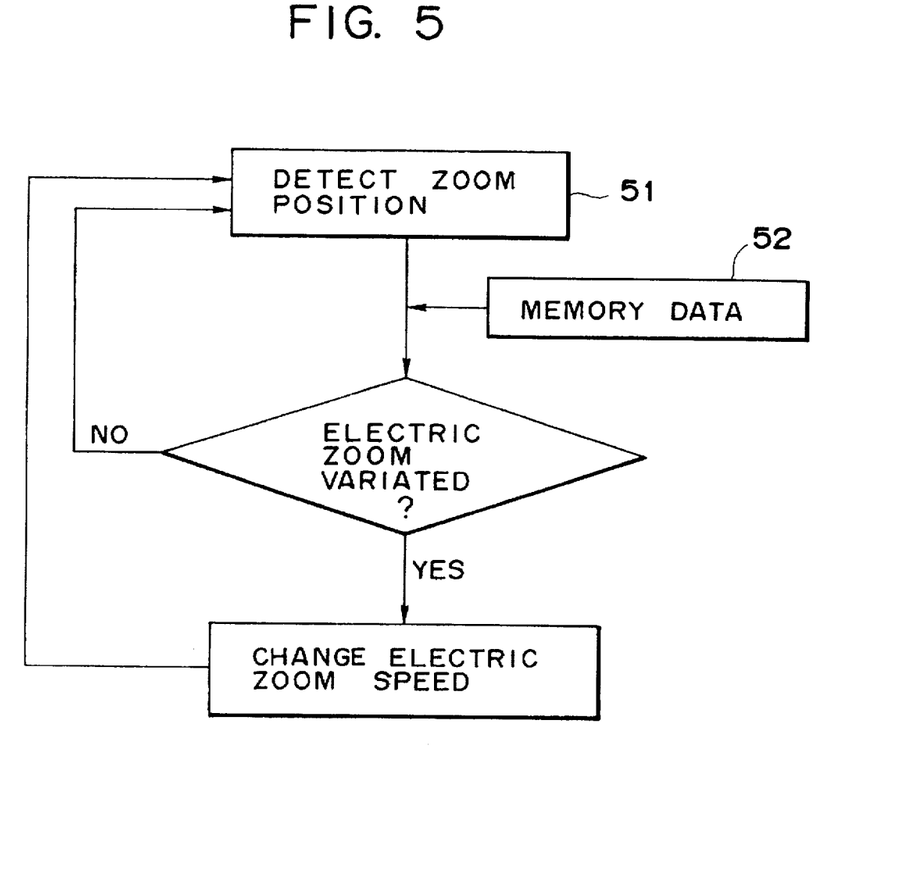
FIG. 5 is a flow chart showing the function relating to the present invention.

FIG. 5 is a schematic flow chart of the control sequence of the present embodiment.

Figure 6:
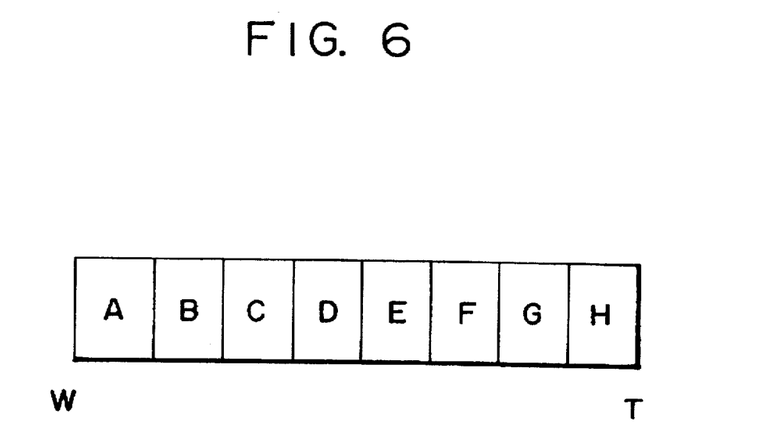
FIG. 6 is a view showing a state of the area division of the optical zooming.

The range from the optical shortest focal length (W: wide angle end) to the optical longest focal length (T: telephoto end) is divided, for example, into zones A–H as shown in FIG. 6, and a speed data to be adopted by the electronic zooming is memorized for each zone. In the present embodiment, the electronic zooming speed becomes faster from the zone A to H. In the optical zooming operation, the zooming position is detected (step 51), then the corresponding memorized data of the electronic zooming speed is read out, and the electronic zooming is executed corresponding to the zooming position.

Said electronic zooming speed data may be memorized in the form of the speed data itself, or in the form of coefficients of a function of the optical zooming position.

The areas of the speed data of the electronic zooming may be divided equally or differently in W to T as a function of the optical focal length.

Figure 7:
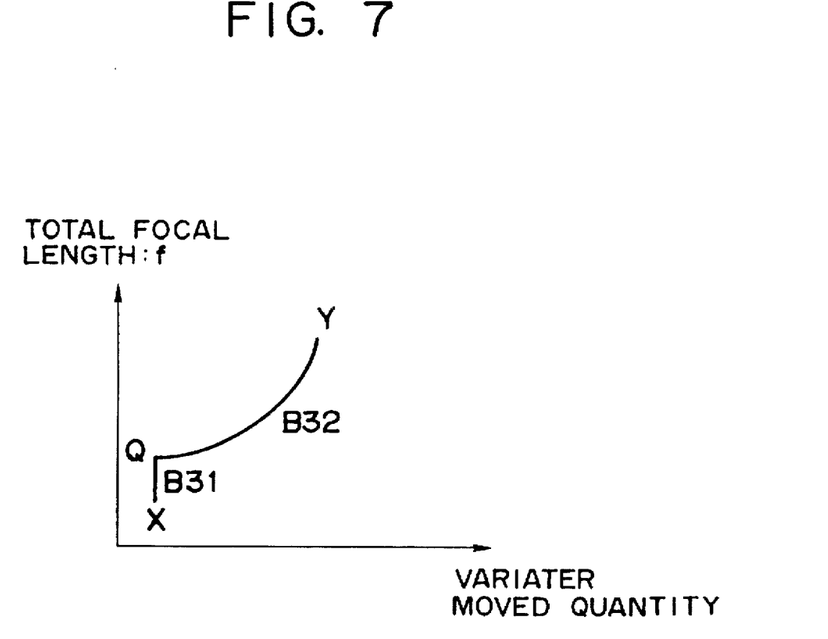
FIG. 7 is a chart showing the relationship between the focal lengths of the optical and electronic zoomings and the amount of movement of the variator lens in the embodiment 3 of the present invention.

FIG. 7 is a chart showing the relationship between the focal lengths of the optical and electronic zoomings and the amount of movement of the variator lens, in a third embodiment of the present invention.

In this embodiment, the image magnification is increased by the electronic zooming alone from the total shortest focal length X to a predetermined focal length Q, excluding the telephoto end of the optical zooming, along a path B31 shown in FIG. 7.

The optical zooming starts from said focal length Q. In the present embodiment, in a zooming path B32 from said focal length Q to the total longest focal length Y, the image magnification is decreased by the electronic zooming and increased by the optical zooming, at the optical shorter focal length side.

The electronic zooming reaches at the smallest magnification in the middle of the zooming path B32, and is then inverted to the increase of the image magnification in the optical longer focal length side.

Figure 8:
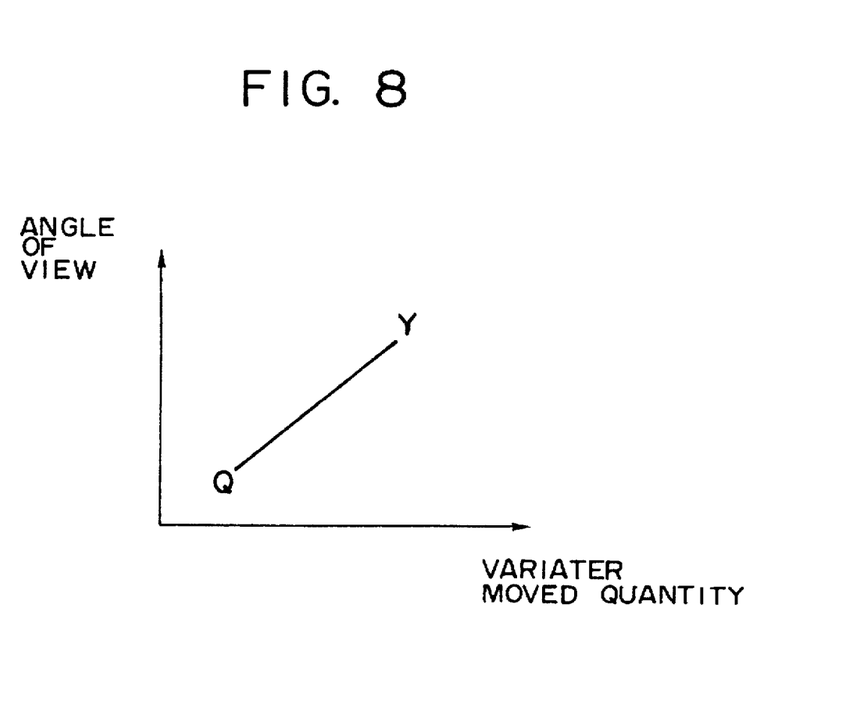
FIG. 8 is a chart showing the relationship between the image angle and the amount of movement of the variator lens in the embodiment 3.

Thus the present embodiment provides a smooth variation of the image angle over the entire variation range of the focal length as shown in FIG. 8, by decreasing the image magnification of the electronic zooming in the optical shorter focal length side and increasing magnification of the electronic zooming in the optical longer focal length side.

More specifically, the apparent variation of image angle as a function of the amount of movement of the variator lens can be made constant, by operating the electronic zooming so as to satisfy the following relating equations.

For an optical focal length $f_p$, a corresponding image angle $\omega_p$, a magnification $\beta_d$ of the electronic zooming and an ideal image height y, there stands a relation:

$$f_p = y/\tan\omega_p \quad (3)$$

Also the total focal length f is represented by:

$$f = f_p * \beta_d \quad (4)$$

Also the image angle $\omega$ corresponding to the total focal length f is represented by:

$$\omega = \tan^{-1}(y/(f_p * \beta_d)) \quad (5)$$

Consequently, in order to obtain a constant image angle variation as a function of the amount of movement of the variator lens within the total range of focal length (from Q to Y in the present embodiment), the magnification of the electronic zooming should be so determined as to satisfy a relation:

$$\tan^{-1}(y/(f_p * \beta_d)) = a*V_p + b \quad (6)$$

wherein $V_p$ is the amount of movement of the variator lens, and a, b are constants. In this manner the image angle becomes approximately proportional to the amount of movement of the variator lens as shown in FIG. 8, so that a smooth zooming operation can be achieved.

In a zooming lens showing a larger image angle variation at the shorter focal length side in case of the optical zooming from the shorter focal length side to the longer focal length side, this embodiment provides a smooth image angle variation without reducing the zooming speed of the variator lens at the optical shorter focal length side, so that a prompt zooming operation is rendered possible.

In this zooming operation, the zooming speeds of the optical and electronic zoomings may be constant or variable.

Figure 9:
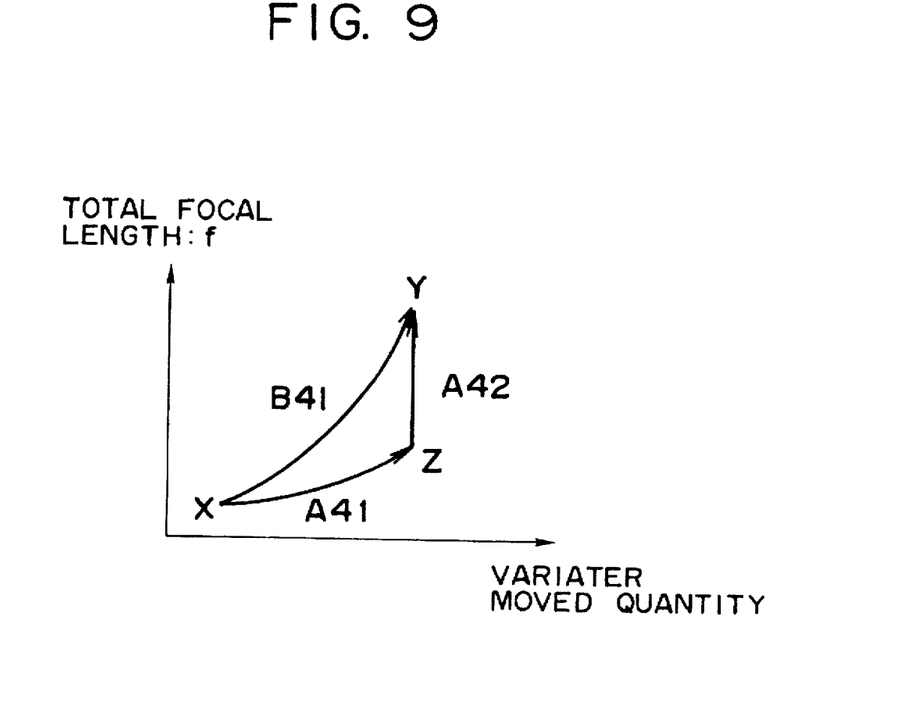
FIG. 9 is a chart showing the relationship between the focal lengths of the optical and electronic zoomings and the amount of movement of the variator lens in the embodiment 4 of the present invention.

FIG. 9 explains a fourth embodiment of the present invention.

In a zoom lens showing a larger image angle variation at the longer focal length side in the optical zooming from the shorter focal length side to the longer focal length side, the conventional zooming operation method is achieved by effecting the optical zooming through a path 41 from the total shortest focal length X to the optical longest focal length Z, and effecting the electronic zooming through a path A42 from said focal length Z to the total longest focal length Y. In contrast, the present embodiment effects both the optical zooming and the electronic zooming from the total shortest focal length X, wherein the speed of increase of image magnification of the electronic zooming is made larger as the optical focal length is shorter.

The above-mentioned zoom lens type has been associated with a drawback that the zooming motion is not smooth at the optical shorter focal length side, because the image angle variation is small. In the present embodiment, the speed of increase of the image magnification of the electronic zooming is selected larger at the optical shorter focal length side, whereby a larger image angle variation can be obtained in the optical shorter focal length side and a smooth image angle variation can be obtained over the entire zooming range.

Figure 10:
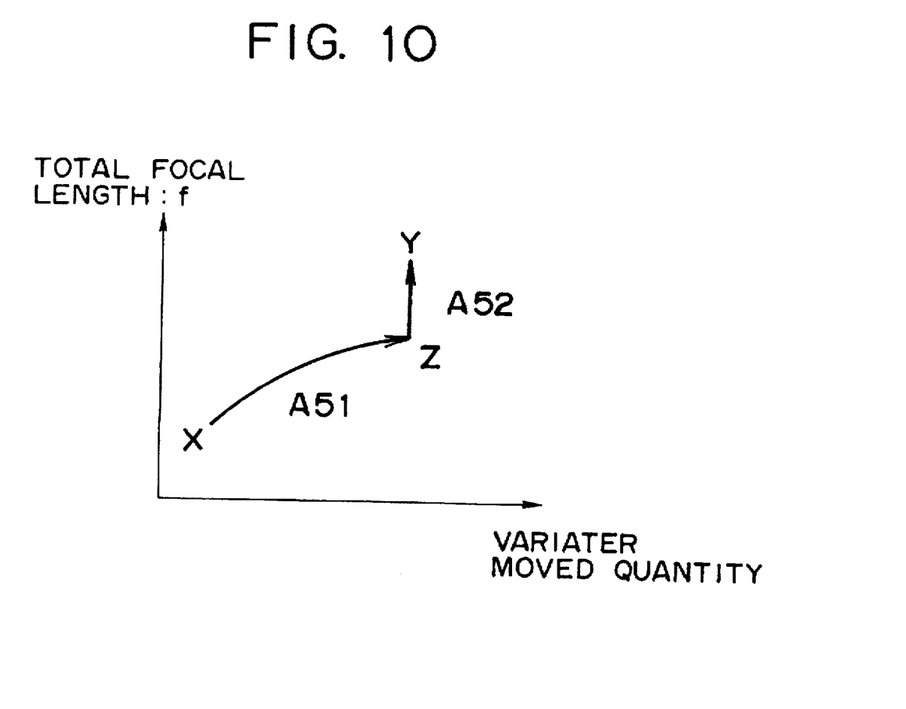
FIG. 10 is a chart showing the relationship between the image angle and the amount of movement of the variator lens in the embodiment 5 of the present invention.

FIG. 10 explained a fifth embodiment of the present invention.

In a zoom lens showing a larger image angle variation in the longer focal length side in an optical zooming operation from the shorter focal length side to the longer focal length side, the optical and electronic zoomings are simultaneously activated from the shortest focal length X, and the speed of increase of the image magnification of the electronic zooming is made larger as the optical focal length is shorter.

In the course of the zooming operation, the electronic zooming is shifted from the increase of magnification to the decrease thereof. After reaching at the optical longest focal length Z, the electronic zooming alone is activated until reaching the total longest focal length Y.

This embodiment provides a smooth image angle variation, by effecting the electronic zooming at higher magnification in the optical shorter focal length side and at lower magnification in the optical longer focal length side.

In the foregoing embodiments, there have only been explained the variations of the total focal length from the wide angle side to the telephoto side, but needless to say, the zooming operations are naturally inversed in case of the variation from the telephoto side to the wide angle side.

As explained in the foregoing, the present invention enables to freely control the zooming speed by means of the optical and electronic zooming operations.

Particularly in an optical zooming operation from the shorter focal length side to the longer focal length side for a zoom lens showing a larger image angle variation in the optical shorter focal length side, a smooth image angle variation can be attained in the zooming operation, by increasing the image angle variation in the optical longer focal length side. It is also rendered possible to facilitate the tracking of the optical cam locus by the compensator lens, without sacrificing the image angle changing, by reducing the moving speed of the variator lens at the optical longer focal length side.

It is furthermore possible to reduce the image angle variation at the optical shorter focal length side without reducing the moving speed of the variator lens, thereby attaining a smooth image angle variation over the entire focal length range.

Furthermore, for a zoom lens showing a larger image angle variation at the longer focal length side in the optical zooming operation from the shorter focal length side to the longer focal length side, the speed of increase of magnification of the electronic zooming is made larger as the optical focal length is shorter, or the speed of decrease of magnification of the electronic zooming is made larger as the optical focal length is longer, thereby attaining a smooth image angle changing.

What is claimed is:

1. An image pickup apparatus comprising:

a zoom lens having an optical characteristic that a change of field angle is not constant during a zooming operation from a wide angle side to a telephoto side;

conversion means for converting an optical image, formed by said zoom lens, into an electrical signal;

process means for processing the electrical signal so as to perform electronic zooming; and control means for controlling continuous overlapping execution of optical zooming by said zoom lens and the electronic zooming by said process means, and for changing a zoom speed of the electronic zooming by said process means in accordance with a focal length of said zoom lens, and wherein said control means is adapted to control said zoom lens and said process means such that a change in magnification caused by the optical zooming is contrary to a change of magnification caused by said process means.

2. An apparatus according to claim 1, wherein said control means is adapted to concurrently effect optical zooming and the electronic zooming such that an image angle changing in accordance with the optical zooming and the electronic zooming remains substantially constant.

3. An apparatus according to claim 1, wherein said control means is adapted to increase a magnification of the optical zooming and to concurrently decrease a magnification of the electronic zooming.

4. An apparatus according to claim 1, wherein:

a change of image angle caused by the optical zooming is larger in a wide angle side than in a telephoto side, and said control means is adapted, during a zooming operation from the wide angle side to the telephoto side, to increase a speed at which magnification of the electronic zooming is increased toward the telephoto side.

5. An apparatus according to claim 1, wherein:

a change of image angle caused by the optical zooming is larger in a wide angle side than in a telephoto side, and said control means is adapted, when performing a zooming operation from the wide angle side to the telephoto side, to increase a speed at which a magnification of the electronic zooming is decreased toward the wide angle side.

6. An apparatus comprising:

a zoom lens having an optical characteristic that a change of field angle is not constant during a zooming operation from a wide angle side to a telephoto side;

driving means for moving said zoom lens;

conversion means for converting an optical image, formed by said zoom lens, into an electrical signal;

process means for processing the electrical signal so as to perform electronic zooming; and control means for controlling said driving means and said process means in a continuously overlapping manner such that change of magnification caused by the driving means is contrary to change of magnification caused by said process means, and for changing a zoom speed of the electronic zooming by said process means in accordance with focal length of said zoom lens.

7. An apparatus according to claim 6, wherein said control means is adapted to increase magnification of optical zooming and to concurrently decrease magnification of electronic zooming.

* * * * *

UNITED STATES PATENT AND TRADEMARK OFFICE
CERTIFICATE OF CORRECTION

PATENT NO. : 5,701,157
DATED : December 23, 1997
INVENTOR(S) : TAKASHI KATO ET AL.

It is certified that error appears in the above-identified patent and that said Letters Patent is hereby corrected as shown below:

On the title page:

[56] REFERENCES CITED

Foreign Patent Documents
"4373368   12/1992 Japan..... H04N   5/228" should be deleted.

In the drawings:

SHEET 1

Fig. 1, "VARIATER" should read --VARIATOR-- (both occurrences).

SHEET 2

Figure 2:
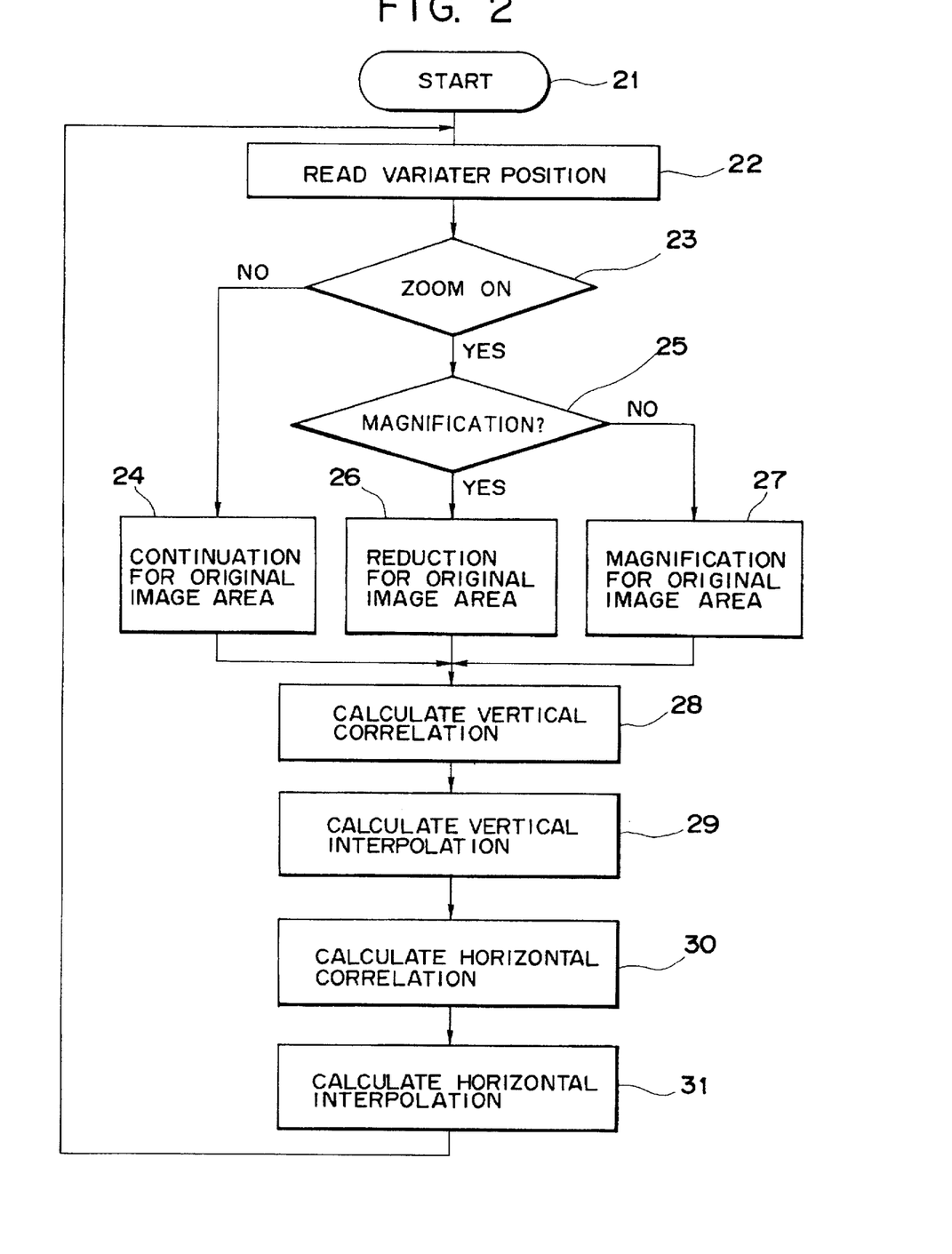
FIG. 2 is a flow chart of the control sequence of the embodiment 1.

Fig 2, "VARIATER" should read --VARIATOR--.

SHEET 3

Fig. 3, "VARIATER" should read --VARIATOR--.
Fig. 4, "VARIATER" should read --VARIATOR--.

SHEET 5

Fig. 7, "VARIATER" should read --VARIATOR--.
Fig. 8, "VARIATER" should read --VARIATOR--.

SHEET 6

Fig. 9, "VARIATER" should read --VARIATOR--.
Fig. 10, "VARIATER" should read --VARIATOR--.

UNITED STATES PATENT AND TRADEMARK OFFICE
CERTIFICATE OF CORRECTION

PATENT NO. : 5,701,157
DATED : December 23, 1997
INVENTOR(S) : TAKASHI KATO ET AL.

It is certified that error appears in the above-identified patent and that said Letters Patent is hereby corrected as shown below:

COLUMN 1

Line 41, "reduced" should read --or reduced--.

COLUMN 2

Line 10, "magnification" should read --magnification of--.

COLUMN 4

Line 35, "read" should read --reads--.

COLUMN 6

Line 21," equations;" should read --equations:--.

UNITED STATES PATENT AND TRADEMARK OFFICE
CERTIFICATE OF CORRECTION

PATENT NO. : 5,701,157
DATED : December 23, 1997
INVENTOR(S) : TAKASHI KATO ET AL.

It is certified that error appears in the above-identified patent and that said Letters Patent is hereby corrected as shown below:

<u>COLUMN 12</u>

Line 22, "focal" should read --a focal--.

Signed and Sealed this

Fifteenth Day of September, 1998

BRUCE LEHMAN

Attest:

*Attesting Officer*    *Commissioner of Patents and Trademarks*